United States Patent Office 3,494,221
Patented Feb. 10, 1970

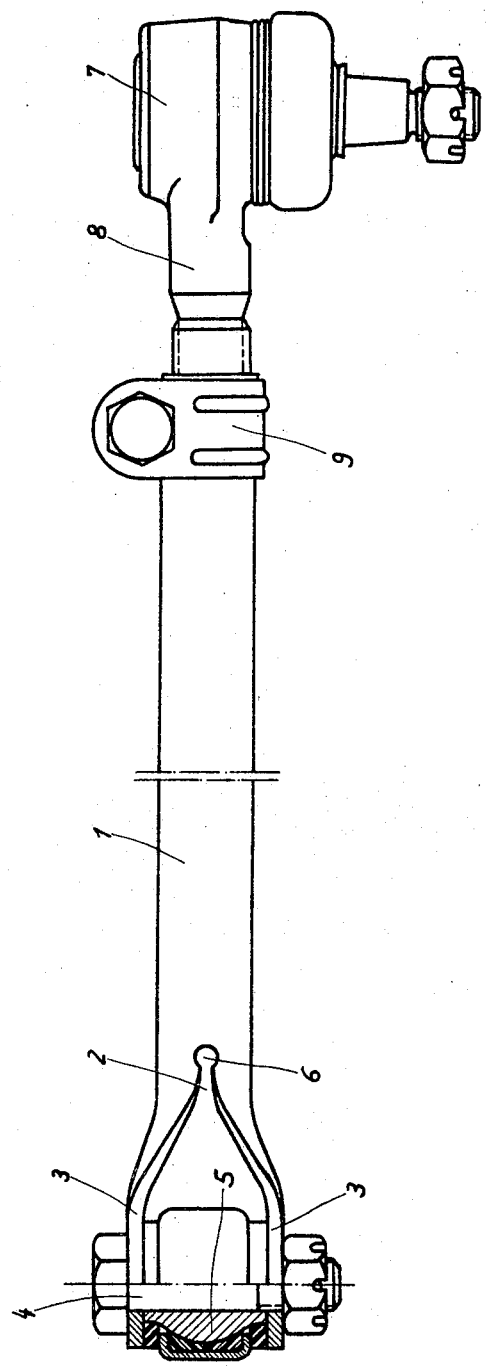

3,494,221
STEERING RODS ONE END OF WHICH BEING JOINT CONNECTED TO A TIE ROD AND THE OTHER END BEING BALL JOINT CONNECTED TO THE STEERING ARM OF A WHEEL
Rudolf Gottschald, Osterath, Germany, assignor to A. Ehrenreich & Cie., Dusseldorf-Oberkassel, Germany
Filed Dec. 18, 1967, Ser. No. 691,473
Claims priority, application Germany, Dec. 29, 1966, E 33,117
Int. Cl. F16h 51/02
U.S. Cl. 74—586    2 Claims

ABSTRACT OF THE DISCLOSURE

A portion of a steering mechanism for vehicles including a fork-like tubular rod receiving the tie rod at one end, and a ball and socket joint for connecting to a steering gear arm at the other end.

---

The present invention relates to a steering rod one end of which being joint connected to a tie rod and the other end being ball joint connected to the steering arm of a wheel, more particularly for rack guides.

It is known with rack guides to connect both the steering rods each via a joint to the center tie rod which is the guide rack. In this case the steering rods are a rod each the end of which to be connected to the center tie rod is a yoke. The connection bolt passes the yoke legs. The other end of the rod has been provided with a ball joint effecting connection with the steering arm of the wheel. Steering rods of the design described are comparatively expensive and require for exact and accurate longitudinal dimensioning.

The object of the present invention is a simplified and less expensive construction of steering rods.

According to the present invention the problem has been solved in that, when producing the steering rod from a tubular piece, the tube has been slotted on the side of connection to the tie rod on a level being located on the axial line of the tube and on the sides which are diametrically opposite to each other, while the free ends of the resulting tubular halves are constructed to form yoke legs as parallel flat flanges to receive the connecting bolt, and in that the tubular piece, on the side of connection to the steering arm, has been provided for screwing in of the joint pin of the ball joint connected to the steering arm.

This measure does not only result in reduced cost in steering rod production, but also in less rigid accuracy requirements in said production, since the joint to be screwed in being a ball joint allows for a certain compensation of accuracy.

Practically, the basis or end respectively of the slottings is a round hole. A round hole prevents undesirable tearing.

The present invention may also be used with steering rods of other guide rods.

The drawing is an example of a construction according to the present invention showing a longitudinal view of a steering rod.

The steering rod consists of a tubular piece 1. On the side of its connection to the tie rod the tubular piece has been slotted on a level being located on the tube axis on the sides which are diametrically opposite to each other. The slotting has been indicated by 2. The resulting tubular halves are transferred into the shape of flat flanges which are parallel to each other. The flat flanges are forming the yoke legs 3 passed by the connecting bolt 4 supporting the connecting block 5 for the tie rod end which may be provided with an eye to receive said connecting block. In the example shown the connecting block has been designed like a ball joint, but it may have any other form, for instance, a silent block.

The basis of the slottings is a round hole 6 its diameter being greater than the width of the slottings.

A ball joint 7 comprising a joint pin 8 has been screwed into the other end of the tubular piece, the joint pin being secured by means of the clamp 9. The ball joint serves to connect the steering arm. Instead of the screw connection of the ball joint to the tubular piece which is known per se it may be possible to choose any other connection already known.

What I claim is:
1. A steering mechanism comprising:
   (a) a tubular rod pipe,
   (b) a connecting block of a tie rod,
   (c) a steering gear arm,
   (d) said pipe having one end including an axial slit forming two halves, each of said halves being flat whereby a fork-like member is obtained,
   (e) coaxial openings in said halves, the axis formed by said coaxial openings being substantially perpendicular to the axis of said pipe,
   (f) bolt means extending through said openings receiving said connecting block of a tie rod,
   (g) a ball and socket joint being adjustably positioned at the end of said pipe opposite said axial slit for connection with said steering gear arm.
2. A steering mechanism as defined in claim 1 including a substantially circular hole at the end of said slit having a diameter greater then the width of the slit adjacent said hole whereby undesirable tearing is prevented.

References Cited

UNITED STATES PATENTS

| 2,616,648 | 11/1952 | Budreck | 287—100 XR |
| 2,723,140 | 11/1955 | Graham | 287—62 |

FOREIGN PATENTS

| 512,175 | 8/1939 | Great Britain. |

FRED C. MATTERN, Jr., Primary Examiner

F. D. SHOEMAKER, Assistant Examiner